United States Patent [19]
Park et al.

[11] Patent Number: 6,091,784
[45] Date of Patent: Jul. 18, 2000

[54] METHOD AND APPARATUS FOR CONSTANT ENVELOPE QUADRATURE AMPLITUDE MODULATION

[75] Inventors: In Jae Park, Kyungki-do; Woo Hyung Lee, Seoul, both of Rep. of Korea

[73] Assignee: Daewoo Telecom Ltd., Incheon, Rep. of Korea

[21] Appl. No.: 08/931,435

[22] Filed: Sep. 16, 1997

[30] Foreign Application Priority Data

Sep. 21, 1996 [KR] Rep. of Korea ................... 96-41512

[51] Int. Cl.$^7$ ................................... H04L 27/36

[52] U.S. Cl. ...................... 375/298; 375/261; 332/103

[58] Field of Search .................... 332/103; 370/206, 370/207; 371/43; 375/261, 265, 280, 288, 298, 308, 322, 332, 341

[56] References Cited

U.S. PATENT DOCUMENTS

| | | | |
|---|---|---|---|
| 4,495,619 | 1/1985 | Acampora | 370/207 |
| 4,730,344 | 3/1988 | Saha | 375/280 |
| 5,659,578 | 8/1997 | Alamouti et al. | 375/261 |

*Primary Examiner*—Stephen Chin
*Assistant Examiner*—Chieh M. Fan
*Attorney, Agent, or Firm*—Notaro & Michalos P.C.

[57] ABSTRACT

A constant envelope quadrature amplitude modulation system is provided for solving the bandwidth efficiency problem resulting from a lack of frequency resources by implementing the constant envelope characteristic for a non-linear communication system, based on a 16-QAM (Quadrature Amplitude Modulation) system. The system limits the data, which will be modulated and transmitted, to 3-bit data and adds a parity bit to make the data have a constant envelope within the 16-QAM system, which modulates data to be transmitted in the unit of 4-bit. The data value of the parity bit is selected to satisfy the condition of a constant envelope in accordance with the QAM signals.

19 Claims, 8 Drawing Sheets

METHOD AND APPARATUS FOR CONSTANT ENVELOPE QUADRATURE AMPLITUDE MODULATION

BACKGROUND OF THE INVENTION

1. Field of the Invention

The present invention relates to a quadrature amplitude modulation (QAM). Specifically, this invention is a method and apparatus for generating a signal having a constant envelope in a 16 QAM system.

2. Discussion of Related Art

As information is getting important in the recent society, many communication terminals, such as a personal communication terminal and a mobile communication terminal, have been developed and spread. Since these communication terminals usually operate digitally, and transmit data through radio, they employ a digital modulation system which mixes digital data with a specified frequency signal, such as sine or cosine wave in signal transmission.

The conventional digital modulation system employed by a mobile or personal communication system is a phase shift keying (PSK) system or a quadrature PSK (QPSK) system. Under the present communication environment where frequency resource is limited, the modulation method described above cannot satisfy the requirements of high speed transmission and mass information transmission, such as image data transmission.

To solve these problems, a QAM system has been developed to obtain higher bandwidth efficiency, compared to the existing PSK or QPSK.

FIG. 1 is a block diagram of a 16 QAM system according to prior art. Serial-to-parallel converter 11 receives 4-bit data in serial and outputs them in parallel. First mapper 12 converts 2-bit data (I, Ī), transmitted from serial-to-parallel converter 11, into level signals corresponding to the relevant data values. Second mapper 13 converts 2-bit data (Q, Q̄), transmitted from serial-to-parallel converter 11, into level signals corresponding to the relevant data values. First and second mappers, 12 and 13, generate specified level signals as the following Table 1;

TABLE 1

| I (Q) | Ī (Q̄) | Output (V) |
| --- | --- | --- |
| 0 | 0 | −1 |
| 0 | 1 | −3 |
| 1 | 0 | +1 |
| 1 | 1 | +3 |

First mixer 14 mixes the level signal generated by first mapper 12 with signal $\cos\omega_0 t$ having a predetermined frequency ($\omega_0$). Second mixer 15 mixes the level signal generated by second mapper 13 with signal $\sin\omega_0 t$, which has the same frequency ($\omega_0$) as the signal $\cos\omega_0 t$ and a phase difference of 90°. Adder 16 sums up the I channel signal, [I(t)], and the Q channel signal, [Q(t)], generated by first and second mixer, 14 and 15, respectively.

In the QAM system, 4-bit data are simultaneously modulated. When expressing a signal interval corresponding to one bit data as a Tb, each data bit is output for 4-Tb. During that time, the data of 4 bits is input to serial-to-parallel converter 11.

FIG. 2 is a graph illustrating a frequency spectrum of a signal output by the QAM system. When the period of the signal is T, the bandwidth of transmitting and receiving frequency is set to 1/T. The bandwidth of a signal according to the above QAM system becomes 1/(4Tb). Therefore, the bandwidth efficiency in the QAM system is double 1/(2Tb) in the QPSK system, or quadruple 1/Tb in the PSK system.

FIG. 3 is a block diagram of a receiver for receiving and demodulating the quadrature amplitude modulated signal through the above operations. Third mixer 31 mixes the received QAM signal with signal $\cos\omega_0 t$ having a predetermined frequency ($\omega_0$). Fourth mixer 32 mixes the received QAM signal with signal $\sin\omega_0 t$, which has the same frequency ($\omega_0$) as the signal $\cos\omega_0 t$ and a phase difference of 90°. First integrator 33 integrates the signal generated by third mixer 31. Second integrator 34 integrates the signal generated by fourth mixer 32. First demapper 35 determines the level of the integrated signal generated by first integrator 33 and generates 2-bit data corresponding to the relevant levels. Second demapper 36 determines the level of the integrated signal generated by second integrator 34 and generates 2-bit data corresponding to the relevant levels.

Parallel-to-serial converter 37 receives the data bits from first and second demappers 35 and 36 in parallel and outputs them in serial. The configuration shown in FIG. 3 receives a signal, for example, $\cos\omega_0 t - \sin\omega_0 t$, transmitted from the QAM system. The input signal becomes $\cos^2\omega_0 t - \cos\omega_0 t \cdot \sin\omega_0 t$ after passing through mixer 31. The signal is then integrated during one symbol period (Tb) by first integrator 33. The integrated signal is expressed as $\int_0^{Tb} \cos^2\omega_0 t\,dt - \int_0^{Tb} \cos\omega_0 t \cdot \sin\omega_0 t\,dt$. This is newly expressed as $$\int_0^{Tb} 1/2\,dt + \int_0^{Tb} 1/2 \cos 2\omega_0 t\,dt - \int_0^{Tb} \cos\omega_0 t \cdot \sin\omega_0 t\,dt. \quad \text{[Formula 1]}$$

Values of $\int_0^{Tb} 1/2\cos 2\omega_0 t\,dt$ and $\int_0^{Tb} \cos\omega_0 t \cdot \sin\omega_0 t\,dt$ are "0", thus the output signal from first integrator 35 is $\int_0^{Tb} 1/2\,dt$.

First integrator 33 and second integrator 34 generate level signals of ±A (A is a specified value) through the above processes. The generated signals are applied to first and second demappers 35 and 36. The demappers 35 and 36 demodulate the signals to restore original data.

However, the conventional QAM system described above has the following problems.

When the data which is input to the modulator is "0000 1011 0110" in the QAM system, signal, [I(t)], which is output by first mixer 14, is shown in FIG. 4A, and signal, [Q(t)], which is output by second mixer 15, is shown in FIG. 4B. Signal, [S(t)], which is output by adder 16, has different amplitudes according to data to be modulated, as shown in FIG. 4C.

For radio communication, since it is necessary to amplify the level of a signal forwarded through an antenna, a high power amplifier must be installed at the front stage of the antenna. Especially, since data must be transmitted between a land station and an artificial satellite, a high power amplifier must be installed at the output stage in a satellite communication system.

Usually a class C amplifier is employed as the high power amplifier to increase electric power efficiency. Since an input-to-output characteristic in the class C amplifier is non-linear, the phase is deviated in accordance with the change of amplitude signal when the amplitude of an input signal changes. This deteriorates the performance of the system. Therefore, the input signal to the high power amplifier, such as a class C amplifier, must have a constant envelope.

However, since the amplitudes of output signals change according to output data in the conventional QAM system, the QAM system cannot be used in a non-linear communication system even though it has high bandwidth efficiency.

SUMMARY OF THE INVENTION

Accordingly, the present invention is directed to a method and apparatus for a QAM having a constant envelope that substantially obviates one or more of the limitations and disadvantages of the related art.

An object of the present invention is to provide a method and apparatus for a constant envelope QAM (CE-QAM).

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method for a QAM includes the steps of: inputting 3-bit data; adding a single parity bit to the information bits to make 4-bit data have a constant envelope; converting the 4-bit data into corresponding first and second level signals by 2-bit; mixing the first level signal with a first frequency signal; mixing the second level signal with a second frequency signal having a predetermined phase difference against the first frequency signal; and adding up signals obtained through two mixing steps.

An apparatus for a QAM consists of: an encoding means for adding a single parity bit to 3-bit of input information; first and second mapping means for respectively generating level signals corresponding to 2-bit of data values among 4-bit generated by the encoding means; a first mixer for mixing the level signal generated by the first mapping means with a first frequency signal; a second mixer for mixing the level signal generated by the second mapping means with a second frequency signal; and an adding means for adding up the signals generated by the first and second mixers.

The first and second mapping means respectively convert 2-bit input data into at least one level signal among the values of −1.21, +1.21, −2.92, and +2.92.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, a preferred embodiment of the present invention is described below.

First, basic concept of the present invention is set forth in the following description.

Figure 1:
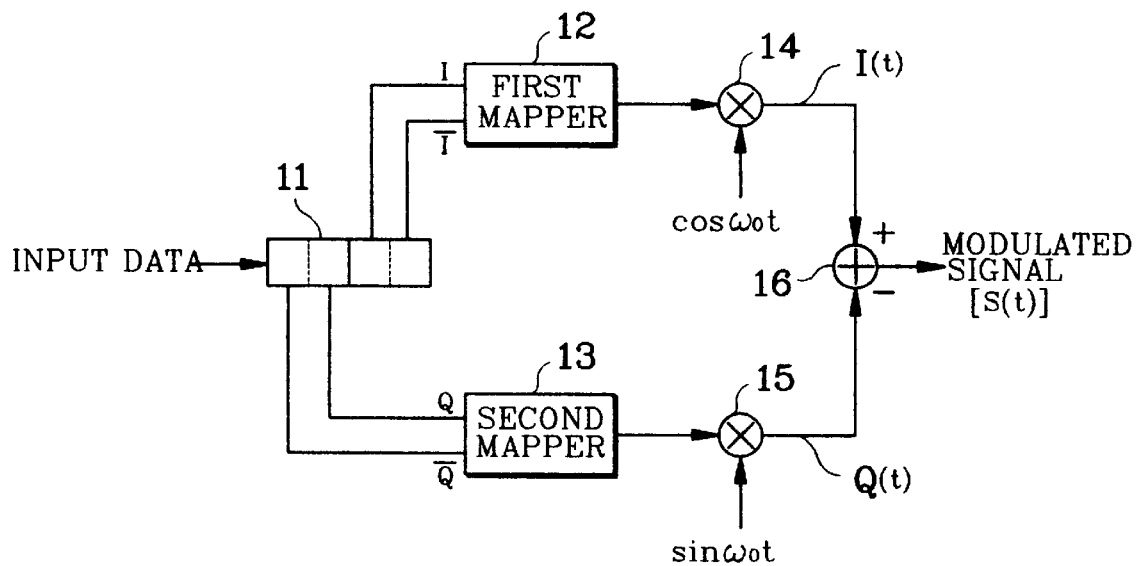
FIG. 1 is a block diagram of a usual 16 QAM system.
Figure 2:
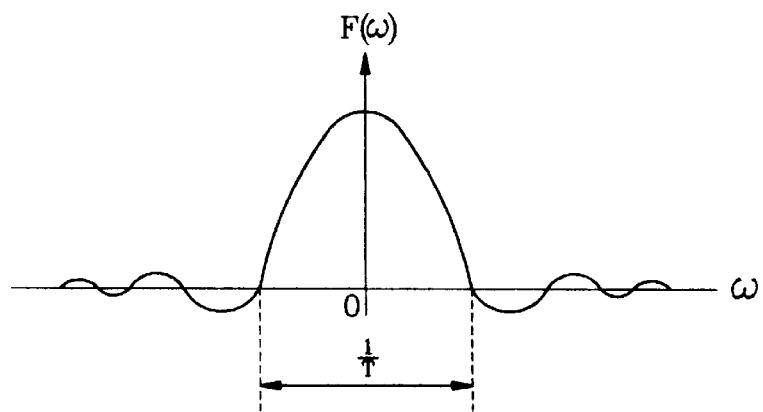
FIG. 2 is a graph showing bandwidth efficiency of a QAM system.

As shown in FIG. 1, modulated signal, [S(t)], which is output by adder 16, is given by $$S(t) = U_I(t) \cos\omega_0 t - U_Q(t) \sin\omega_0 t. \quad \text{[Formula 2]}$$

This is expressed as the following formula.

$$S(t) = A(t) \sin(\omega_0 t + \theta(t)), \quad \text{[Formula 3]}$$

where amplitude, A (t), and phase, θ(t), are given by the following formulas 4 and 5, respectively.

$$A(t) = \sqrt{U_I(t)^2 + U_Q(t)^2} \quad \text{[Formula 4]}$$

$$\theta(t) = \tan^{-1}\left[-\frac{U_Q(t)}{U_I(t)}\right] \quad \text{[Formula 5]}$$

To make output signal, [S(t)], which is output by the QAM system, have a constant envelope, the amplitude, [A(t)], expressed as the Formula 3, must have a constant value. Therefore, the following conditions for a constant envelope are derived from the Formula 3:

$$A(t) = \sqrt{U_I(t)^2 + U_Q(t)^2} = \text{Constant}, \quad \text{[Formula 6]}$$

or $$U_I(t)^2 + U_Q(t)^2 = \text{Constant}, \quad \text{[Formula 7]}$$

and $$|U_I(t)| \neq |U_Q(t)|. \quad \text{[Formula 8]}$$

In the 16 QAM system using the level values of −1, −3, +1, and +3, as shown in Table 1, the following eight subsets $(U_I, U_Q)$ satisfying the Formulas 7 and 8, are obtained: (−3, −1), (−3, +1), (−1, −3), (−1, +3), (+1, −3), (+1, +3), (+3, −1), (+3, +1). The values of the subsets $(U_I, U_Q)$, are not predetermined, but change according to 4-bit data to be transmitted, as shown in FIG. 1, so it is impossible to satisfy the constant envelope characteristic, using the 4-bit data, which will be modulated.

The present invention limits the data, which will be modulated and transmitted, to 3-bit, and adds one parity bit to make the output signal have the constant envelope in the 16 QAM system, which modulates data to be transmitted in the unit of 4-bit.

When the level values corresponding to the data values of the channels I and Q shown in FIG. 1 are established as shown in Tables 2 and 3, when the data of the channel I is fixed as transmission data, and when a parity bit P for the constant envelope characteristic is added to the data of the channel Q, parity bits corresponding to the data to be modulated can be obtained as shown in Table 4.

TABLE 2

Level translation of channel I

| I | Ī | Output (V) |
|---|---|---|
| 0 | 0 | −3 |
| 0 | 1 | −1 |
| 1 | 0 | +1 |
| 1 | 1 | +3 |

TABLE 3

Level translation of channel Q

| Q | Q̄ | Output (V) |
|---|---|---|
| 0 | 0 | −1 |
| 0 | 1 | −3 |
| 1 | 0 | +3 |
| 1 | 1 | +1 |

TABLE 4

Parity bit and corresponding level translation

| I | Ī | Q | P | I Output | Q output |
|---|---|---|---|---|---|
| 0 | 0 | 0 | 0 | −3 | −1 |
| 0 | 0 | 1 | 1 | −3 | +1 |
| 0 | 1 | 0 | 1 | −1 | −3 |
| 0 | 1 | 1 | 0 | −1 | +3 |
| 1 | 0 | 0 | 1 | +1 | −3 |
| 1 | 0 | 1 | 0 | +1 | +3 |
| 1 | 1 | 0 | 0 | +3 | −1 |
| 1 | 1 | 1 | 1 | +3 | +3 |

In Tables 2 through 4, the level translation values of the I channel data and the Q channel data are not limited to specific examples. The parity bit can also be added to the channel I, not limiting to the channel Q. In any cases, the output signal is made to have the constant envelope in the same way, based on the concept described above.

Figure 5:
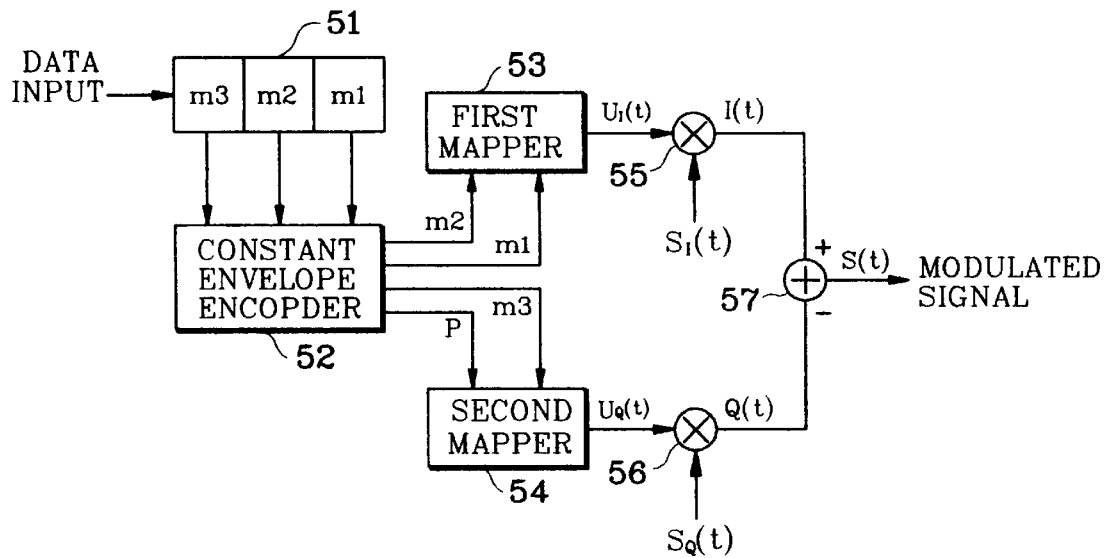
FIG. 5 is a block diagram of an apparatus for a 16 CE-QAM system according to the present invention.

FIG. 5 is a block diagram of a QAM system according to the present invention.

Serial-to-parallel converter 51 receives three serial bits (m1, m2, m3) and outputs them in parallel. Constant envelope encoder 52 adds a predetermined parity bit P to the 3-bit data (m1, m2, m3) transmitted by serial-to-parallel converter 51, and generates 4-bit data (m1, m2, m3, p) having the constant envelope characteristic.

First mapper 53 converts the 2-bit data for the channel I, m1 and m2, output by constant envelope encoder 52, into corresponding level signals. Second mapper 54 converts the 2-bit data for the channel Q, m3 and p, output by constant envelope encoder 52, into corresponding level signals.

First mixer 55 mixes the signal, [$U_I(t)$], output by first mapper 53, with a predetermined first frequency signal, [$S_I(t)$]. Second mixer 56 mixes the signal, [$U_Q(t)$], output by second mapper 53, with a predetermined second frequency signal, [$S_Q(t)$]. Cosine wave or sine wave can be used as the first and second frequency signals, [$S_I(t)$, $S_Q(t)$], as shown in FIG. 1.

Adder 57 adds up the I channel signal, [I(t)], and Q channel signal, [Q(t)], which are respectively output by first and second mixers, 55 and 56.

Constant envelope encoder 52 adds the predetermined parity bit p to the 3-bit data (m1, m2, m3) output by serial-to-parallel converter 51, and generates 4-bit data (m1, m2, m3, p) having the constant envelope characteristic.

Figure 6:
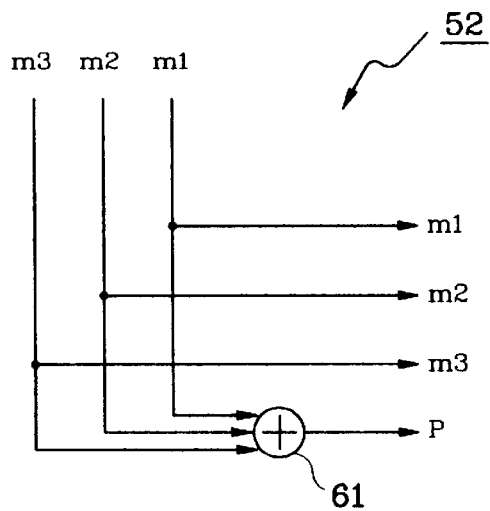
FIG. 6 illustrates an exemplary embodiment of the constant envelope encoder shown in FIG. 5.

In Table 4, a parity bit is obtained by exclusively adding up the values of 3-bit data. Constant envelope encoder 52 outputs the input data bits (m1, m2, m3) as they are, based upon the Table 4, and modulo-two adder 61 adds up 3-bit data (m1, m2, m3) as shown in FIG. 6. Constant envelope encoder 52 is not limited to a specific configuration, but designed to correspond to the levels of signals converted by first and second mappers 53 and 54.

Figure 7:
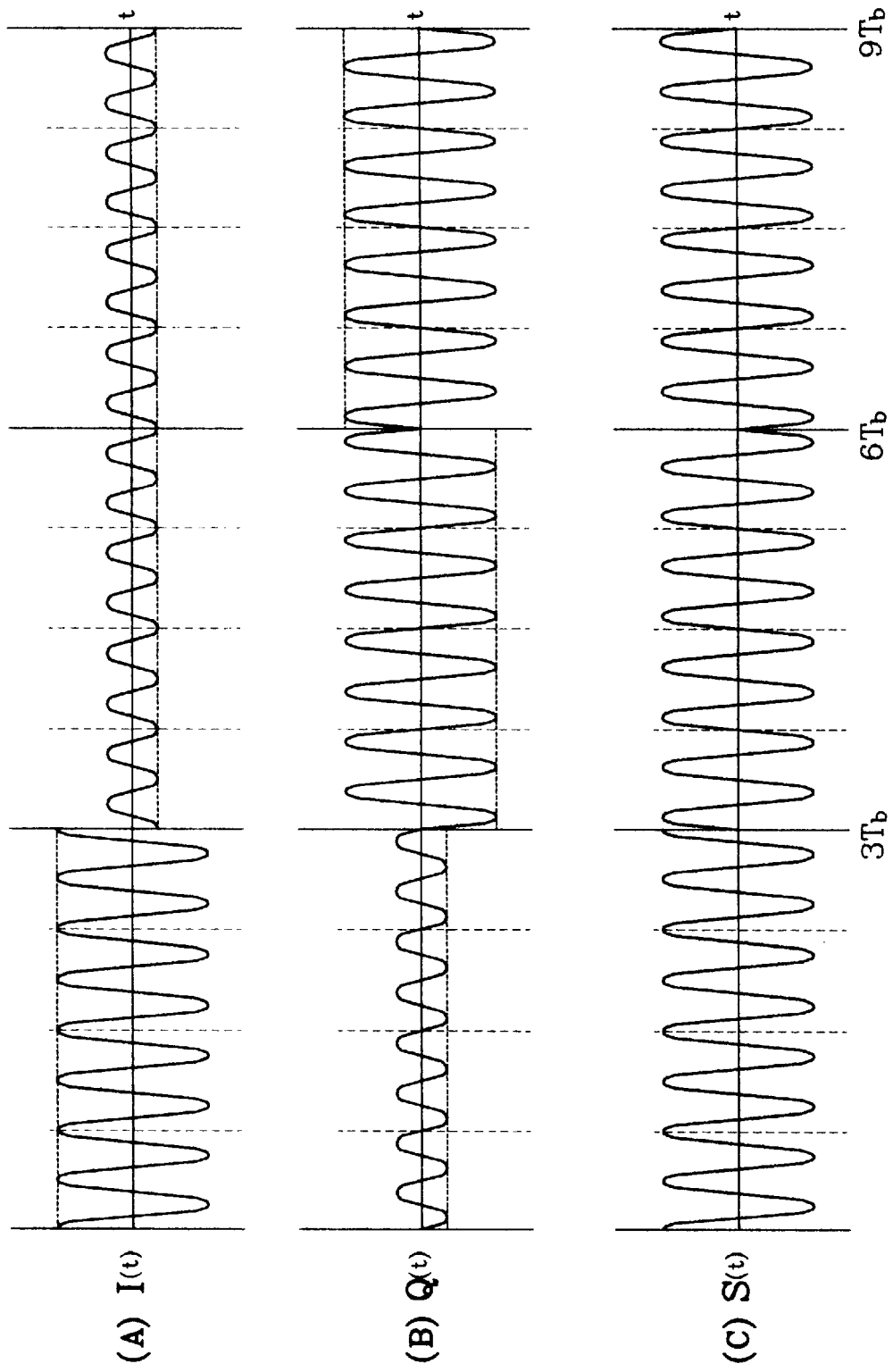
FIGS. 7A through 7C illustrate output waveforms of the CE-QAM according to the present invention.

The data is sent to first and second mapper 53 and 54 after being encoded by constant envelope encoder 52. As shown in FIG. 7, the amplitudes of I channel signal, [I(t)], and Q channel signal, [Q(t)], are complementarily established, thus the amplitudes of modulated signals, [s(t)], output through an output stage, become constant.

Figure 8:
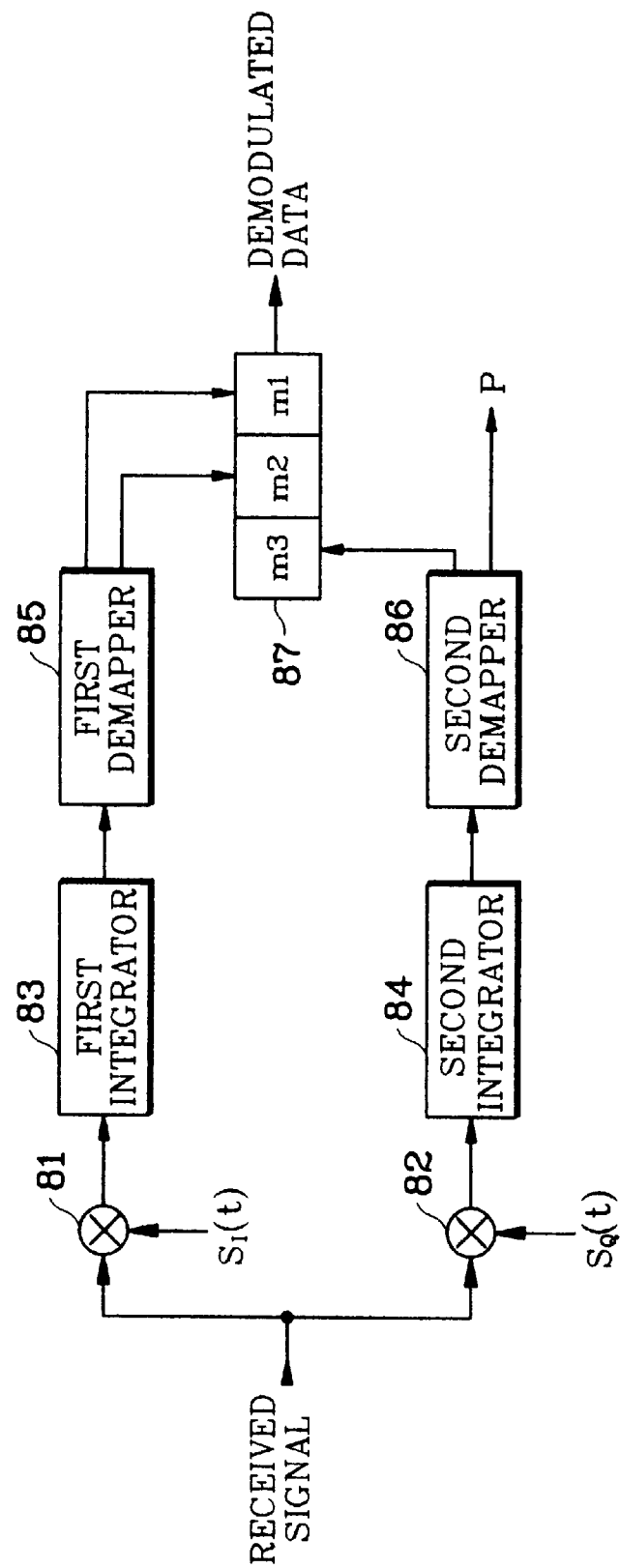
FIG. 8 is a block diagram of a demodulator according to the present invention.

FIG. 8 is a block diagram of a demodulator for demodulating the modulated signal output by the QAM system.

Third mixer 81 mixes the signal transmitted from QAM system with a predetermined first frequency signal, [$S_I(t)$]. Fourth mixer 82 mixes the signal transmitted from QAM system with a second frequency signal, [$S_Q(t)$], having a phase difference of 90° against the first frequency signal, [$S_I(t)$].

First integrator 83 integrates a frequency signal output by third mixer 81. Second integrator 84 integrates a frequency signal output by fourth mixer 82.

First demapper 85 generates 2-bit data (m1, m2) corresponding to the levels of signals output by first integrator 83. Second demapper 86 generates 2-bit data (m3, p) corresponding to the levels of signals output by second integrator 84, in which one bit p is a parity bit.

Parallel-to-serial converter 87 receives the 3-bit data (m1, m2, m3) output by first and second mappers 85 and 86 in parallel, and sequentially outputs them in serial.

Figure 3:
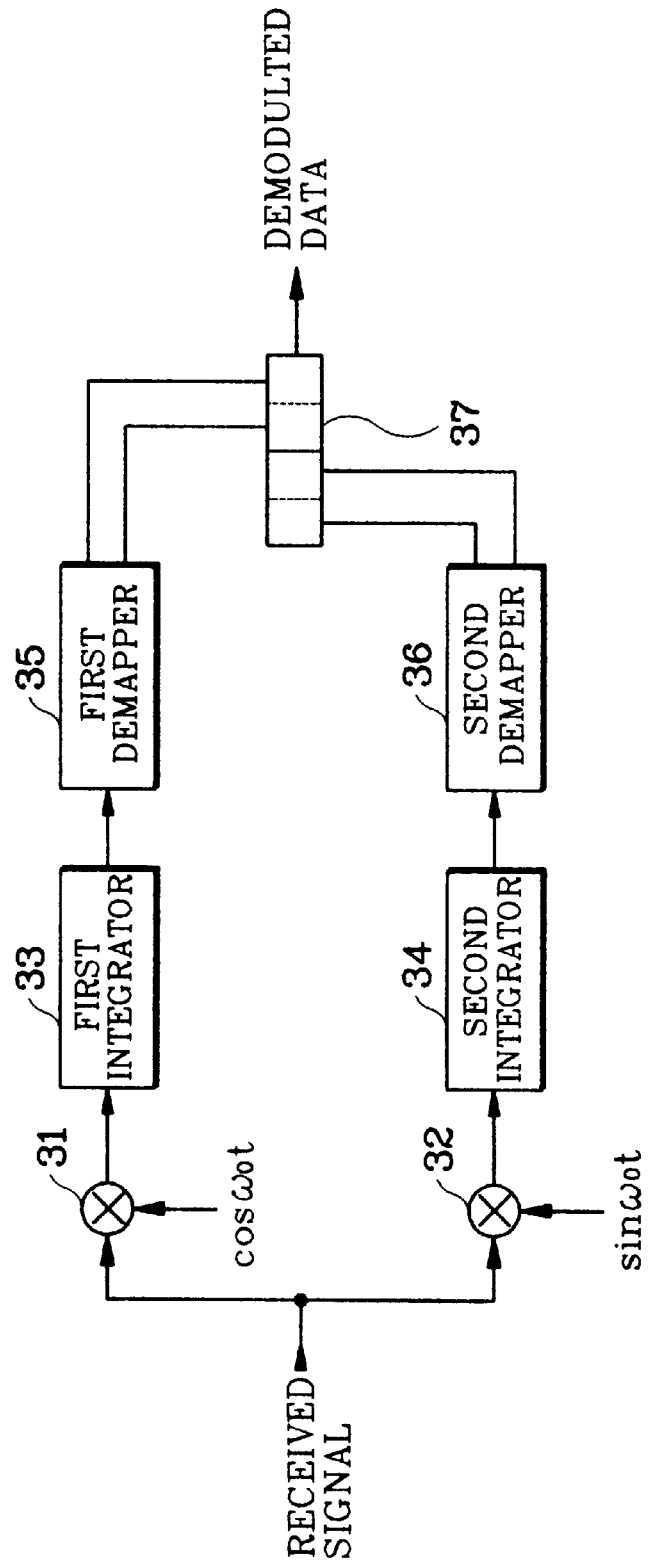
FIG. 3 is a block diagram of a demodulator for demodulating 16 QAM signals.
Figure 4:
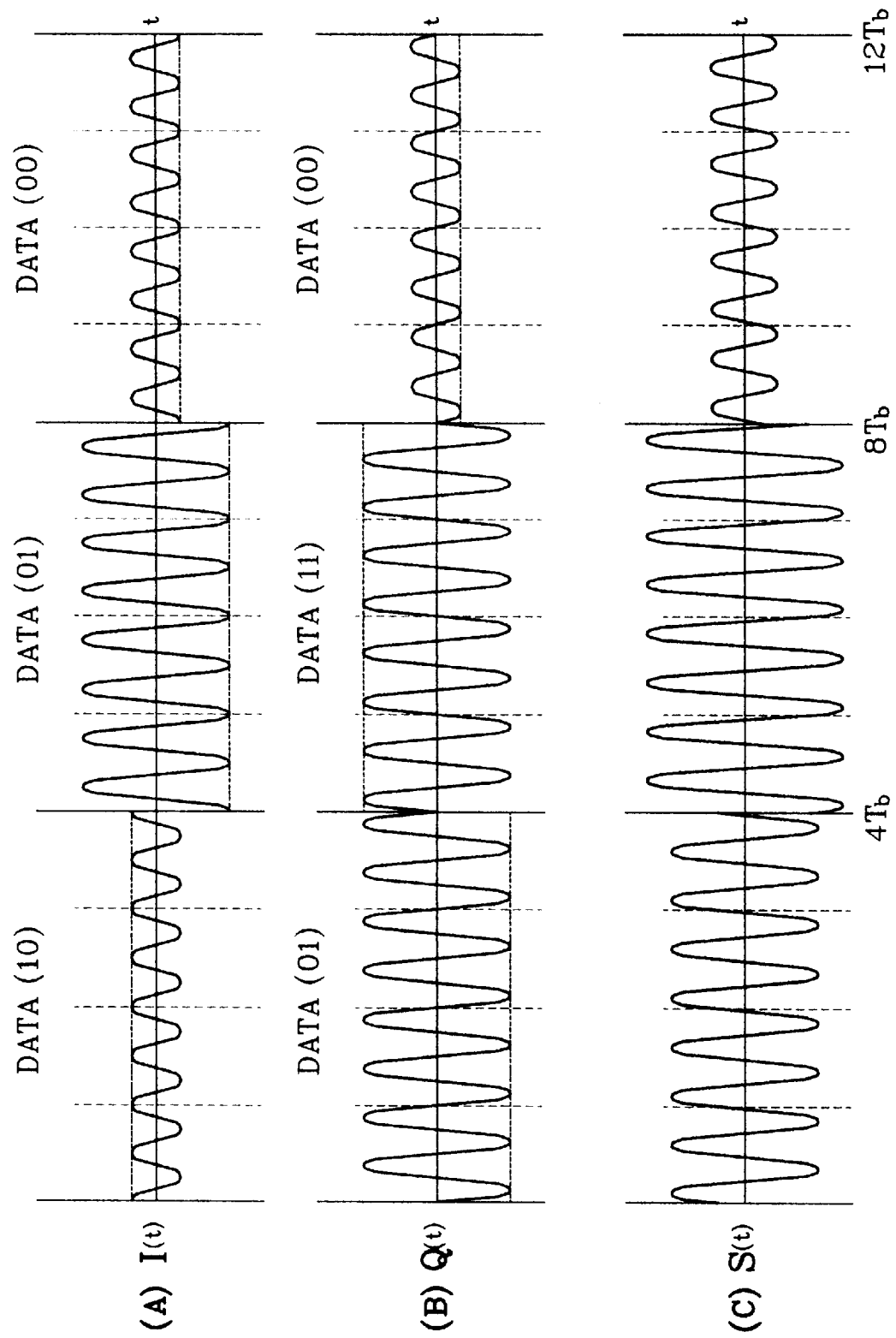
FIG. 4A through 4C are waveforms of modulated signals showing the problems of the conventional QAM system.

The configuration of the demodulator described above is substantially the same as the conventional demodulator as shown in FIG. 3, but one of the bits output by second mapper 86 is detected as a parity bit in this demodulator according to the present invention. Therefore, the conventional demodulator can be used as it is, thus QAM system according to the present invention can be employed without spending additional expense.

Figure 9:
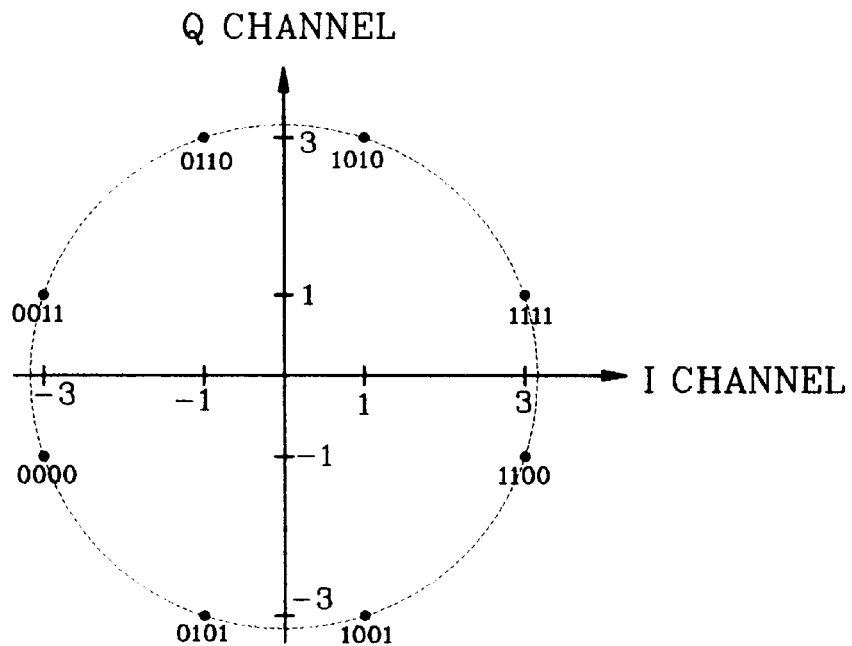
FIGS. 9 and 10 are constellation points diagrams of CE-QAM system according to the present invention.

FIG. 9 is a constellation points diagram of CE-QAM system according to the present invention. Constellation points are positioned at a same distance from the central point, showing the fact that the constant envelope characteristic is implemented.

However, in this signal constellation, the distance between constellation points "1010" and "1111" is longer than the distance between constellation points "1111" and "1100". This limits the system efficiency.

According to our research, when establishing the translation level of data bit modulation to ±1.21 and ±2.92, not to conventional values ±1 and ±3, an optimal distribution of constellation points is achieved, thus increasing a minimum distance of about 20.1%, and obtaining a relatively good minimum distance in the ranges of ±1.18 to ±1.25 and ±2.90 to ±2.95.

Figure 10:
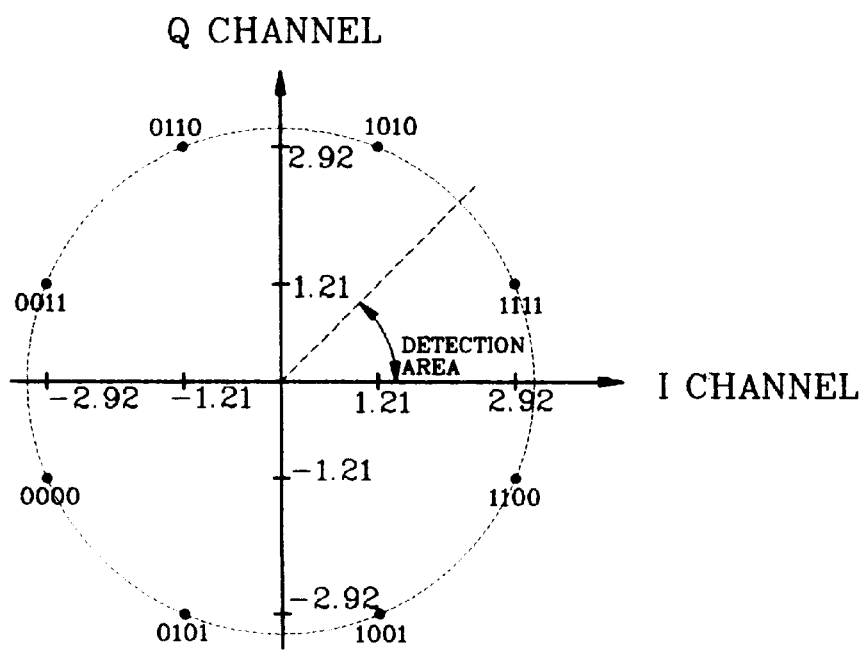

FIG. 10 shows how constellation points are distributed when the translation levels of data bits are limited to ±2.21 and ±2.92. Compared with FIG. 9, constellation points in FIG. 10 are uniformly distributed, thus the minimum distance is increased.

As illustrated above, the present invention can provide a method for a CE-QAM, which is applicable to a non-linear communication system by making the QAM system of high bandwidth efficiency have a constant envelope. In the above exemplary embodiment, a minimum Hamming distance ($H_{min}$) increases because of the parity bit which is added for implementing the constant envelope characteristic, thus Euclidean distance, or nonidentification of signal waveforms, increases.

Usually, a symbol error rate ($P^+_E$) against S/N (signal-to-noise ratio) can be approximately expressed through the following formula.

$$P^r_E = 1 - \int_{-\pi/M}^{\pi/M} \sqrt{\frac{\gamma}{\pi}} \cos\theta e^{-\gamma \sin^2\theta} d\theta \quad \text{[Formula 9]}$$

The Formula 9 becomes $$P^r_E = 1 - \left(1 - \int_{\sqrt{\gamma}\sin\pi/M}^{\infty} \sqrt{\frac{\gamma}{\pi}} \cos\theta e^{-u^2} du\right)$$

and is newly expressed as $$P^r_E = erfc\left(\sqrt{\gamma} \sin\frac{\pi}{M}\right)$$

so the symbol error rate ($P^+_E$) is given by the following Formula 10.

$$P^r_E = 2Q\left(\sqrt{\frac{2E_s}{N_0}} \sin\frac{\pi}{M}\right) \quad \text{[Formula 10]}$$

where $\gamma$ is S/N, M is a number of constellation points, and $E_s$ is average symbol energy.

When considering the Hamming distance, the symbol error rate is given by the following Formula 11.

$$2Q\left(\sqrt{\frac{H_{min} \times R \times 2E_s}{N_0}} \cdot \sin\frac{\pi}{M}\right) \quad \text{[Formula 11]}$$

where $H_{min}$ is a minimum Hamming distance, and R is a coding rate.

In this QAM method according to the present invention, the minimum Hamming distance is 2, and the coding rate is 3/4, thus the Formula 11 is expressed as the following Formula 12.

$$Q\left(\sqrt{\frac{1.5 \times 2E_s}{N_0}} \cdot \sin\frac{\pi}{M}\right) \quad \text{[Formula 12]}$$

Euclidean distance according to Formula 12 is 1.22 times, or $\sqrt{1.5}$ times, as great as that according to Formula 10.

Figure 11:
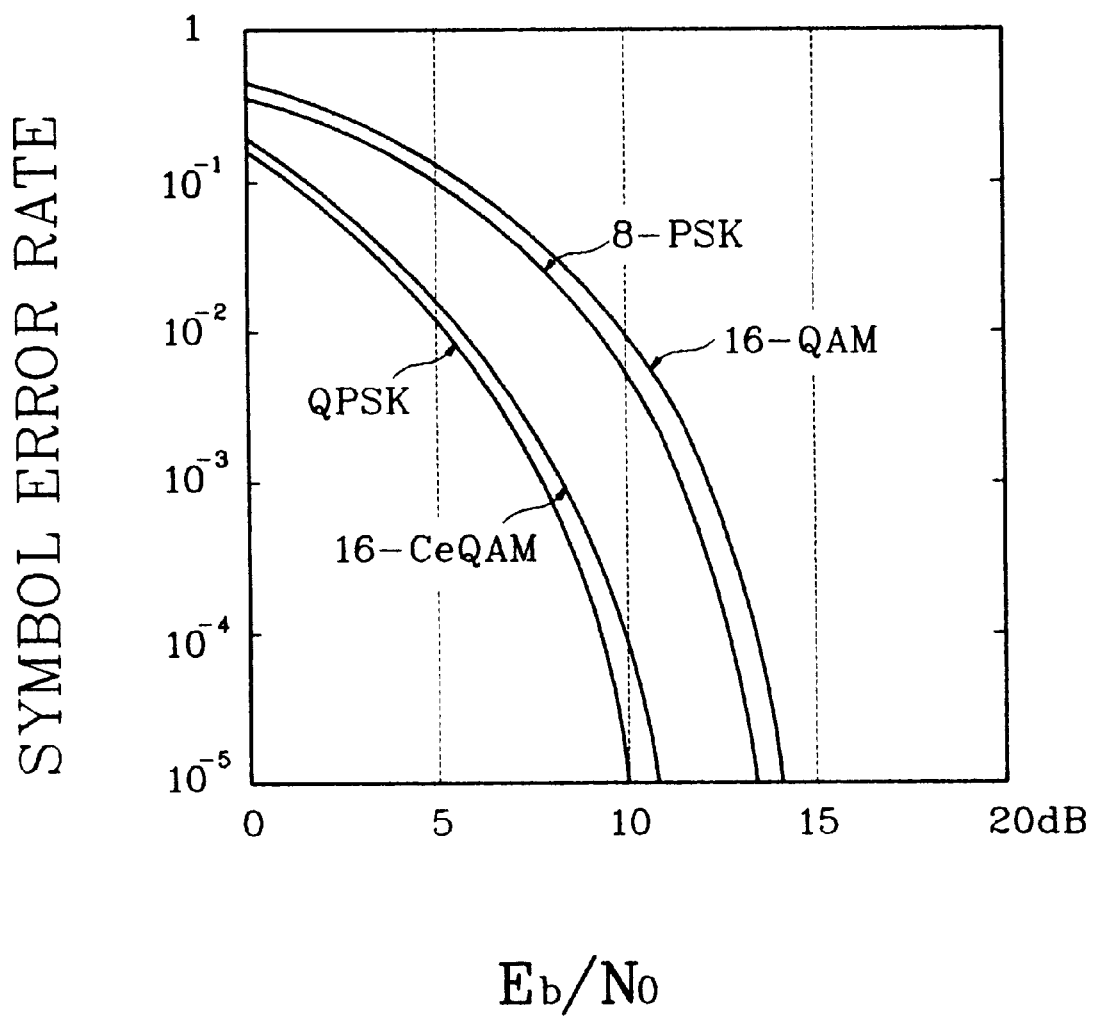
FIG. 11 is a graph for explaining a symbol error rate in the CE-QAM system according to the present invention.

FIG. 11 is a characteristic curve diagram showing symbol error rates according to each digital modulation system. Compared with the conventional 16 QAM system, the 16 CeQAM system according to the present invention is better by about 3.7 dB at SER=$10^{-5}$.

As described above, the present invention makes modulated signals to be transmitted have a constant envelope in the 16 QAM system, thereby allowing the QAM system to be applicable to a non-linear communication system. Additionally, in the present invention, a minimum Hamming distance increases through a parity bit which is added to information bits, thereby implementing successful operation in the conventional QAM system.

It will be apparent to those skilled in the art that various modifications and variations can be made in a method and apparatus for a CEQAM of the present invention without deviating from the spirit or scope of the invention. Thus, it is intended that the present invention cover the modifications and variations of this invention provided they come within the scope of the appended claims and their equivalents.

What is claimed is:

1. A method for a quadrature amplitude modulation (QAM) which converts each 2-bit data into first and second signals having predetermined levels, respectively, corresponding to values of 2-bit data so as to modulate data bits in the unit of 4-bit, the method comprising:

generating 4-bit data by adding a parity bit to three information bits; and setting the parity bit to make $U_I^2+U_Q^2$ have a constant value when the first signal level is $U_I$ and the second signal level is $U_Q$.

2. A method for QAM which classifies data bits into first and second bit sequences of predetermined bits and converts the first and second bit sequences to first and second signals having predetermined levels, respectively, corresponding to the data values fo bit sequences so as to modulate, the method comprising:

inputting a predetermined number of information bits;

adding a predetermined number of parity bits to the information bits, wherein the parity bit is set to make $U_I^2+U_Q^2$ have a constant value when the first signal level is $U_I$ and the second signal level is $U_Q$; and performing the QAM with the data bits to which the parity bit is added.

3. A method for QAM which cconverts each 2-bit data into first and second signals having predetermined levels, respectively, corresponding to the values of 2-bit data so as to modulate data bits in the unit of 4-bit, the method comprising:

inputting 3-bit information;

adding a parity bit to the information bits, wherein the parity bit is set to make $U_I^2+U_Q^2$ have a constant value when the first signal level is $U_I$ and the second signal level is $U_Q$;

converting the 4-bit data into first and second signals, by 2-bit, having predetermined values, respectively, corresponding to values of 2-bit data;

mixing the first signal with a first frequency signal;

mixing the second signal with a second frequency signal having a predetermined phase different from the first frequency signal; and adding together the signals obtained by the two mixing steps.

4. The method according to claim 3, wherein the first and second level signals respectively have at least one level value among the values of -1, +1, -3, and +3.

5. The method according to claim 3, wherein the first and second level signals respectively have at least one level value among the values of -1.18 to -1.25, +1.18 to +1.25, -2.90 to -2.95, and +2.90 to +2.95.

6. The method according to claim 5, wherein the first and second level signals respectively have at least one level value among the values of -1.01, +1.21, -2.92, and +2.92.

7. The method according to claim 3, wherein the first and second level signals respectively have at least one level value among the values of -1.21, +1.21, -2.92, and +2.92.

8. An apparatus for QAM which converts each 2-bit data into first and second signals having predetermined levles, respectively, corresponding to the values of 2-bit data, so as to modulate data bits in the unit of 4-bit, the apparatus comprising:

encoding means for adding a parity bit to 3-bit input information, the parity bit set to make $U_I^2+U_Q^2$ have a constant value when the first signal level is $U_I$ and the second signal level is $U_Q$;

first and second mapping means for generating level signals corresponding to each data value of 2-bit among the 4-bit data generated by the encoding means;

a first mixer for mixing the level signal generated by the first mapping means with a first frequency signal;

a second mixer for mixing the level signal generated by the second mapping means with a second frequency signal; and adding means for adding together the signals generated by the first and second mixers.

9. The apparatus according to claim 8, wherein the first and second mapping means respectively convert 2-bit input data into at least one level signal among values of −1, +1, −3, and +3.

10. The apparatus according to claim 8, wherein the first and second mapping means respectively convert 2-bit input data into at least one level signal among the values of −1.18 to −1.25, +1.18 to +1.25, −2.90 to −2.95, and +2.90 to +2.95.

11. The apparatus according to claim 8, wherein the first and second mapping means respectively convert 2-bit input data into at least one level signal among the values of −1.21, +1.21, −2.92, and +2.92.

12. The apparatus according to claim 8, wherein the first mapping means converts input 2-bit signals, "00", into a level signal, "−2.92", "01" into "−1.21", "10" into "+1.21", and "11" into "+2.92", and the second mapping means converts "00" into "−1.21", "01" into "−2.92", "10" into "+2.92", and "11" into "+1.21".

13. The apparatus according to claim 8, wherein the encoding means adds the parity bit "1" when the number of data "1", contained in the input information bits is odd, and adds the parity bit "0" when the number of data "1", contained in the input information bits, is even.

14. The apparatus according to claim 8, wherein the first mapping means converts 2-bit signals, "00", into a level signal, "−3", "01" into "−1", "10" into "+1", and "11" into "+3", and the second mapping means converts "00" into "−1", "01" into "−3", "10" into "+3", and "11" into "+1".

15. The apparatus according to claim 9, wherein the first mapping means converts 2-bit signals, "00", into a level signal, "−3", "01" into "−1", "10" into "+1", and "11" into "+3", and the second mapping means converts "00" into "−1", "01" into "−3", "10" into "+3", and "11" into "+1".

16. The apparatus according to claim 10, wherein the first and second mapping respectively means convert 2-bit input data into at least one level signal among the values of −1.21, +1.21, −2.92, and +2.92.

17. The apparatus according to claim 12, wherein the encoding means adds the parity bit "1" when the number of data "1", contained in the input information bits, is odd, and adds the parity bit "0" when the number of data "1", contained in the input information bits, is even.

18. The apparatus according to claim 13, wherein the encoding means includes an adder for adding the input information bits.

19. The apparatus according to claim 14, wherein the encoding means adds the parity bit "1" when the number of data "1", contained in the input information bits, is odd, and adds the parity bit "0" when the number of data "1", contained in the input information bits, is even.

* * * * *